United States Patent [19]

Williams

[11] 4,233,942
[45] Nov. 18, 1980

[54] ANIMAL EAR PROTECTORS

[76] Inventor: James D. Williams, 3700 Westfall Dr., Encino, Calif. 91436

[21] Appl. No.: 9,776

[22] Filed: Feb. 6, 1979

[51] Int. Cl.³ .............................................. A01K 29/00
[52] U.S. Cl. ..................................................... 119/96
[58] Field of Search ...................... 119/96, 104; 54/71, 54/79, 80

[56] References Cited

U.S. PATENT DOCUMENTS

| 3,924,388 | 12/1975 | Morrison | 54/80 |
| 3,942,306 | 3/1976 | Kulka | 54/80 |

Primary Examiner—Gene Mancene
Assistant Examiner—Robert P. Swiatek
Attorney, Agent, or Firm—Spensley, Horn, Jubas & Lubitz

[57] ABSTRACT

This invention provides a device for protecting the ears of animals, especially long-haired dogs, from becoming soiled by the animal's food while the animal is eating. The device provides a generally tubular shaped member for containing and protecting each ear of the animal, and a member to position the tubular member and animal ears away from the mouth and food of the animal while it is eating.

1 Claim, 4 Drawing Figures

U.S. Patent  Nov. 18, 1980  4,233,942
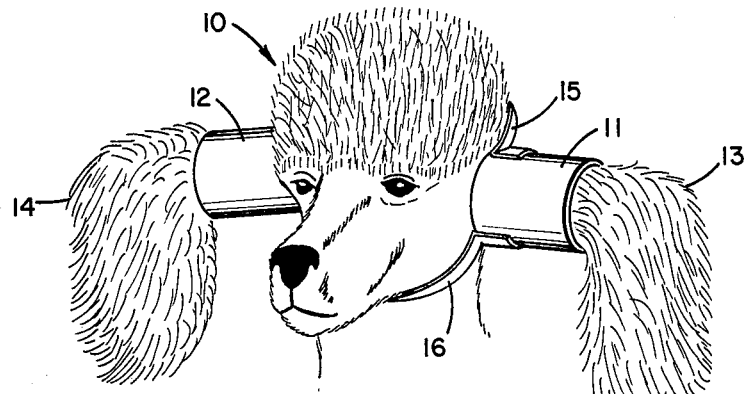
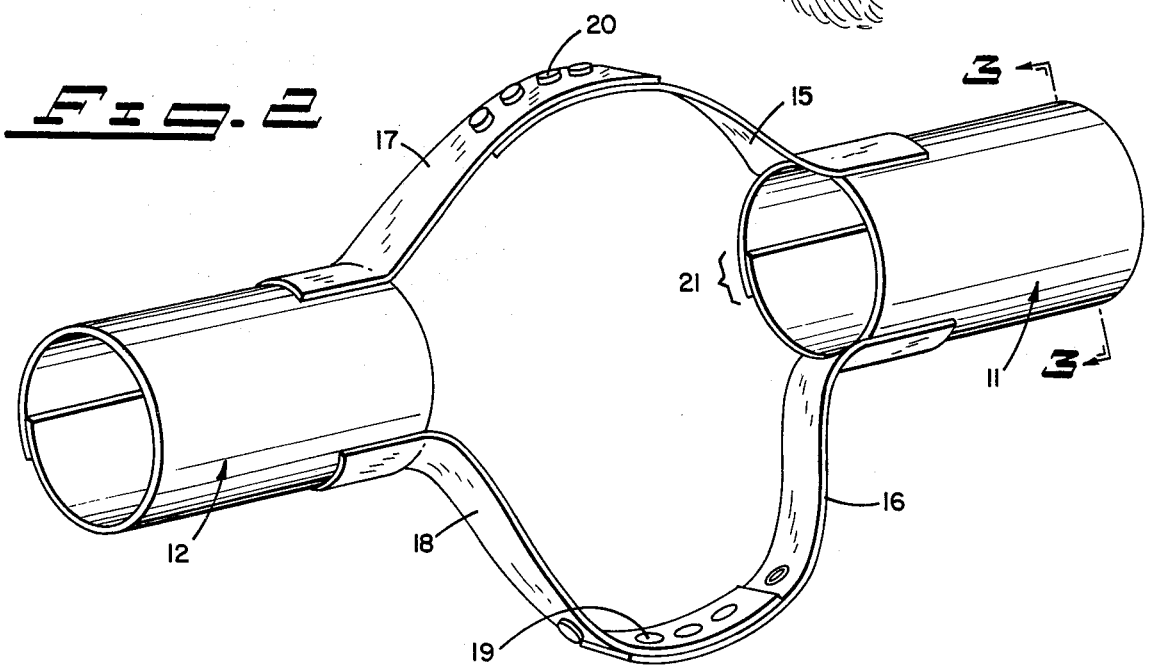
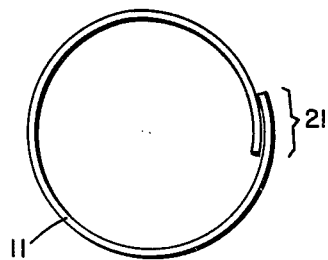
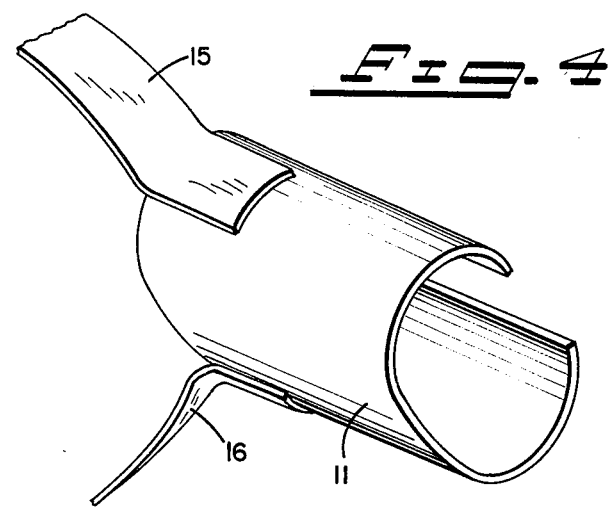

ANIMAL EAR PROTECTORS

BACKGROUND OF THE INVENTION

1. Field of the Invention

The herein disclosed invention relates to devices for maintaining an animal's ears away from its mouth and food while it is eating.

2. Description of the Prior Art

Many devices have been designed to protect the head and ears of animals, including man. Such protectors have been designed with numerous purposes in mind. For instance, there are a variety of human activities which have specially designed head protectors available for participants. For instance, football helmets, bicycling helmets, motorcycle helmets, ski masks, and so on. Animals too have had a variety of head coverings designed for their use. For instance, horses are often equipped with blinders, restricting their vision and focusing their attention as desired. Horses also have been the object of inventions which allow them to be controlled when they are endangered by fire but uncontrollable due to their irrational fear of the fire, as disclosed in U.S. Pat. No. 584,947 to H. Lundborg.

Another class of head coverings seeks to protect the wearer against a hazardous environment, such as toxic fumes, noxious smells, deafening or injurious noise levels, blinding lights, and other such environmental discomforts.

The herein disclosed invention concerns itself with a problem which has been heretofore recognized but inadequately solved. It is the objective of the invention to protect the ears of long eared animals, especially dogs, from coming into contact with their food or drink while they eat. It is the objective of the invention to provide such a device which does not interfere with the eating of the animal, does not itself come into contact with the animal's food, is light weight, comfortable, and not easily removed by the animal. Further, the invention has as objectives that it be easily put on and taken off the animal, adjustable for a variety of sizes of ears and animal heads, and may be itself decorated so as to enhance the appearance of the animal in the eyes of its owner and of others.

SUMMARY OF THE INVENTION

These and other objectives are provided for by a device which provides a generally tubular shaped protector for each ear of the animal. Each protector may be formed of a self biasing plastic sheet which forms a tube, yet can be opened to allow easy insertion of the animals ear. The ear protectors and animal's ears are held away from the head of the animal by two straps, one passing above, one below the head of the animal. The straps are adjustable to accomodate various sizes of animal heads and animal ears, and to allow for the comfortable consumption of food and drink by the animal while wearing the device.

BRIEF DESCRIPTION OF THE DRAWINGS

FIG. 1 is a perspective view of the device while it is being worn by a long eared dog.

FIG. 2 is a front elevational view of the device.

FIG. 3 is partial sectional view of one ear protector, illustrating the self biasing tubular shape of the ear protector.

FIG. 4 is partial perspective view of one ear protector while it is opened to allow insertion of an animal's ear.

DETAILED DESCRIPTION OF THE PREFERRED EMBODIMENTS

FIG. 1 illustrates a long eared poodle wearing the herein described invention. The invention should not be viewed as limited to use only on poodles, since it is equally useful for any animal having long ears which may dangle into its food or drink while it is eating. The poodle 10 has its left ear 13 partially enclosed by a left ear protector 11. The left ear protector 11 is generally tubular shaped and allows for the containment of that portion of the animal's ear nearest its skull. The right ear 14 of the animal is similarly partially contained within the right ear protector 12. Both ear protectors 11, 12 are held in such a position as to project away from the sides of the animal's skull. Such positioning is accomplished via two positioning straps, best illustrated in FIG. 2.

The upper positioning strap which passes above the head of the animal 10 is composed of a left upper strap 15, a right upper strap 17, and a fastener 20. The left upper strap is attached to the left ear protector 11. It should be noted that the description of the ear protectors as left or right is based upon which ear of the animal is contained within the ear protector. Accordingly, in FIG. 2 the left ear protector is on the right hand side of the drawing. The right upper strap 17 is similarly attached to the right ear protector 12.

The fastener 20 between the left 15, and right 17 upper straps may consist of a snap assembly, buckel assembly, hook and hole, or any similar attachment means. In fact, it is not even necessary to have a fastener 20 if the left 15 and right 17 upper straps are permanently attached together into a unitary upper strap which is suitably elastic. The herein disclosed invention should not be limited to a particular means for fastening the left 15 and right 17 upper straps together since the teachings of the invention is met by any upper strap means which accommodates itself to the particular animal wearing in the device.

The left ear protector 11 also has attached to it a left lower strap 16. Similarly, the right ear protector 12 has attached to it a right lower strap 18. The left 16 and right 18 lower strap are fastened to each other via a fastener assembly 19. As was previously discussed with the upper strap assembly, the means for fastening the left 16 and right 18 lower straps to each other are not critical to the teachings of the invention. What is critical is that neither the upper nor lower strap assemblies provide for discomfort to the animal, and that they position the left 11 and right 12 ear protectors to project outwardly from the side of the animal's skull. Additionally, the lower strap assembly should be sufficiently loose for the animal to comfortably swallow.

FIG. 3 is a sectional view of the left ear protector when viewed in a plane perpendicular to the axis of the generally tubular shape of the ear protectors. Although the ear protectors 11, 12 have a generally tubular shape, in one embodiment of the invention, the ear protectors 11,12 have been formed from a sheet of material which tends to form itself into a tube. The ends of the sheet overlap as at 21, thereby completely enclosing a portion of the animal's ear.

FIG. 4 is a partial perspective view of the left ear protector 11. In FIG. 4, the left ear protector 11 is opened, creating a gap within the generally tubular shaped of the ear protector 11 to allow for easy insertion of the animal's ear. After the animal's ear has been inserted, the self biasing nature of the ear protector 11 causes the ear to be completely encircled by the ear protector 11. In this manner, the ear is firmly yet comfortably positioned away from its mouth and from its food.

One advantage of the herein disclosed invention is that it not only substantially reduces or eliminates the soiling of an animal's ears while it is eating, but it also prevents the soiling of the ear protector device itself. This advantage is obtained because the elements of the device are also held away from the mouth and food of the animal.

While only a limited number of embodiments of the disclosed invention have been discussed herein, it will be readily apparent to persons skilled in the art that certain changes and modifications may be made without departing from the spirit or scope of the invention. Accordingly, the foregoing disclosure, description and figures are for illustrative purposes only and are not in any way intended to limit the invention, which is defined only by the claims.

I claim:

1. A device for protecting animal ears comprising:

a pair of generally tubular protectors each of which is formed of a sheet of self-biasing material which in their free state tend to form themselves into said generally tubular protectors;

each of said protectors being longitudinally openable to allow easy insertion of one of said animal ears; and positioning means for flexibly joining one end of one protector in spaced apart relationship with one end of the other protector and for securing said device to the head of said animal such that the longitudinal axis of each protector and a portion of each ear of said animal, are held generally horizontally and approximately perpendicularly to the head of said animal whereby the ends of said animal ears are separated by a distance greater than the width of the head of said animal.

* * * * *